United States Patent
Joo et al.

(10) Patent No.: US 10,963,619 B2
(45) Date of Patent: Mar. 30, 2021

(54) METHOD OF DESIGNING MEMORY SYSTEM BY CONSIDERING POWER CHARACTERISTICS, METHOD OF FABRICATING MEMORY SYSTEM, AND COMPUTING SYSTEM FOR DESIGNING MEMORY SYSTEM

(71) Applicant: SAMSUNG ELECTRONICS CO., LTD., Suwon-si (KR)

(72) Inventors: Kun Joo, Suwon-si (KR); Jaeyoung Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/594,880

(22) Filed: Oct. 7, 2019

(65) Prior Publication Data

US 2020/0117769 A1 Apr. 16, 2020

(30) Foreign Application Priority Data

Oct. 12, 2018 (KR) .................. 10-2018-0122045
Jul. 31, 2019 (KR) .................. 10-2019-0093369

(51) Int. Cl.
*G06F 30/398* (2020.01)
*G06F 30/327* (2020.01)
*G06F 119/06* (2020.01)

(52) U.S. Cl.
CPC .......... *G06F 30/398* (2020.01); *G06F 30/327* (2020.01); *G06F 2119/06* (2020.01)

(58) Field of Classification Search
CPC ...... G06F 30/30; G06F 30/327; G06F 30/367; G06F 30/398; G06F 2219/06; G06F 2219/08; G06F 2219/10; G06F 21/81; G06F 30/33
USPC ................... 816/109, 133; 716/109, 133
See application file for complete search history.

(56) References Cited

U.S. PATENT DOCUMENTS

| | | |
|---|---|---|
| 6,745,145 B2 | 6/2004 | Lara et al. |
| 8,286,110 B1 | 10/2012 | Kukal et al. |
| 8,386,229 B1 | 2/2013 | Anderson et al. |
| 8,949,102 B2 | 2/2015 | Dai et al. |
| 9,098,671 B2 | 8/2015 | Ding et al. |
| 9,767,240 B2 | 9/2017 | Bickford et al. |
| 2004/0078588 A1* | 4/2004 | Chow ............... H04L 9/0625 726/36 |
| 2006/0058994 A1* | 3/2006 | Ravi ............... G06F 30/33 703/23 |
| 2008/0040563 A1* | 2/2008 | Brittain ............... G11C 5/143 711/154 |
| 2009/0113220 A1* | 4/2009 | Lee ............... G06F 21/81 713/193 |
| 2014/0074449 A1 | 3/2014 | Turner et al. |
| 2016/0034622 A1 | 2/2016 | Sarkar et al. |

(Continued)

*Primary Examiner* — Paul Dinh
(74) *Attorney, Agent, or Firm* — Sughrue Mion, PLLC

(57) ABSTRACT

A method of designing a memory system, which includes a semiconductor device and a power supply circuit supplying power to the semiconductor device via a board power distribution network, includes analyzing power characteristics of respective components of the power supply circuit by using a power characteristic model of the power supply circuit, and analyzing power characteristics of the memory system. The power characteristic model of the power supply circuit includes an encrypted model.

8 Claims, 10 Drawing Sheets

(56) References Cited

U.S. PATENT DOCUMENTS

2016/0371411 A1\* 12/2016 Subramaniam ......... G06F 30/33
2018/0238966 A1    8/2018 Louco et al.

\* cited by examiner

METHOD OF DESIGNING MEMORY SYSTEM BY CONSIDERING POWER CHARACTERISTICS, METHOD OF FABRICATING MEMORY SYSTEM, AND COMPUTING SYSTEM FOR DESIGNING MEMORY SYSTEM

CROSS-REFERENCE TO RELATED APPLICATIONS

This application claims priority from Korean Patent Application No. 10-2018-0122045, filed on Oct. 12, 2018, and Korean Patent Application No. 10-2019-0093369, filed on Jul. 31, 2019, in the Korean Intellectual Property Office, the disclosures of each of which are incorporated by reference herein in their entirety.

BACKGROUND

1. Field

Methods consistent with the present disclosure relate to a method of designing a memory system, a method of fabricating the memory system, and a computing system for designing the memory system, and more particularly, to a method of designing a memory system by taking into account power characteristics of the memory system, a method of fabricating the memory system, and a computing system for designing the memory system.

2. Description of Related Art

A large number of elements are arranged in memory systems, and memory systems include power supply circuits and power distribution networks (PDNs) for supplying power to memory chips. As the sizes of memory systems have been gradually reduced and the degrees of integration thereof have increased, noise generated from power distribution networks has increasingly influenced circuits configured in memory systems. Noise generated from power distribution networks may be caused by parasitic resistance and parasitic capacitance of the power distribution networks and, to check the influence of noise on operations of semiconductor devices, an operation of analyzing power characteristics of power distribution networks has been performed. However, there has been a limit in analyzing power characteristics of overall memory systems by analyzing only power characteristics of power distribution networks.

SUMMARY

It is an aspect to provide a method of designing a memory system by taking into account power characteristics of the memory system through the analysis of power characteristics of a power supply circuit, a method of fabricating the memory system, and a computing system for designing the memory system.

According to an aspect of an example embodiment, there is provided a method of designing a memory system which includes a semiconductor device and a power supply circuit supplying power to the semiconductor device via a board power distribution network, the method including analyzing power characteristics of respective components of the power supply circuit by using a power characteristic model of the power supply circuit; and analyzing power characteristics of the memory system, wherein the power characteristic model of the power supply circuit includes an encrypted model.

According to another aspect of an example embodiment, there is provided a method of fabricating a memory system which includes a semiconductor device and a power supply circuit supplying power to the semiconductor device via a board power distribution network, the method including analyzing power characteristics of respective components of a power supply circuit by using a power characteristic model of the power supply circuit; analyzing power characteristics of the memory system by using the power characteristic model of the power supply circuit, a board power distribution network model of the board power distribution network, and a power characteristic model of the semiconductor device; and mounting the semiconductor device and the power supply circuit on a board, based on the analyzed power characteristics of the memory system.

According to yet another aspect of an example embodiment, there is provided a computing system for designing a memory system which includes a semiconductor device and a power supply circuit supplying power to the semiconductor device, the computing system including a memory storing a synthesis tool, a power analysis tool, a power characteristic model of the power supply circuit, and a power characteristic model of the semiconductor device; and a processor executing the synthesis tool and the power analysis tool by accessing the memory, wherein the processor analyzes power characteristics of respective components of the power supply circuit by using the power characteristic model of the power supply circuit and analyzes power characteristics of the memory system, and the power characteristic model of the power supply circuit includes an encrypted model.

BRIEF DESCRIPTION OF THE DRAWINGS

Embodiments will be more clearly understood from the following detailed description taken in conjunction with the accompanying drawings in which.

DETAILED DESCRIPTION

Figure 1:
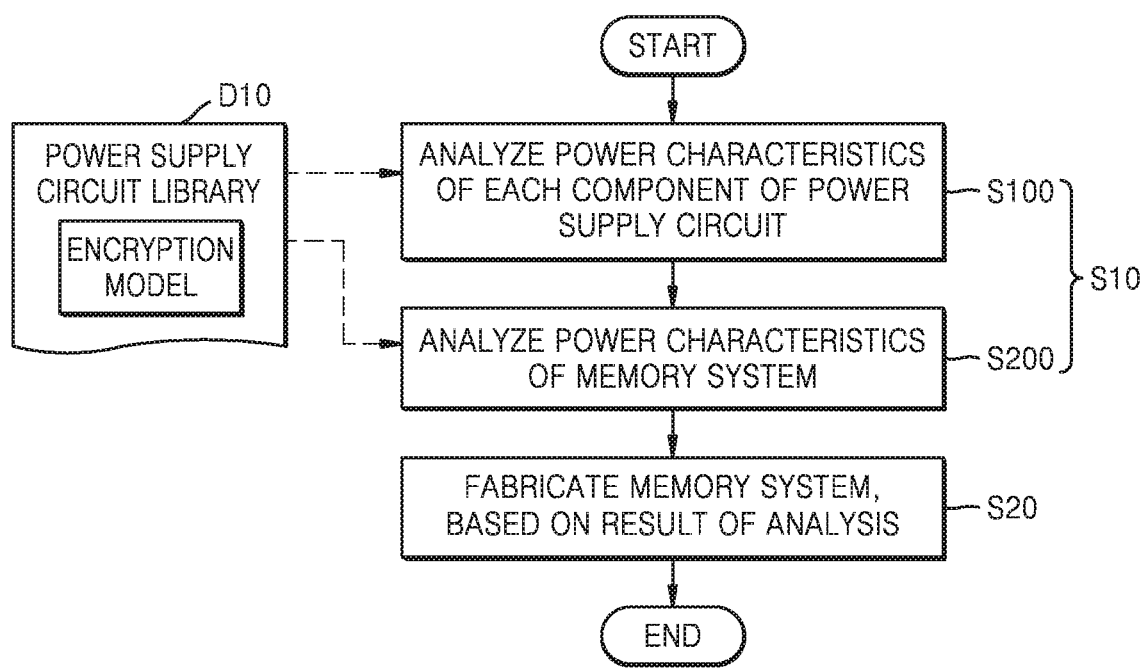
FIG. 1 is a flowchart illustrating a method of fabricating a memory system, according to an example embodiment.

FIG. 1 is a flowchart illustrating a method of fabricating a memory system, according to an example embodiment.

Figure 2:
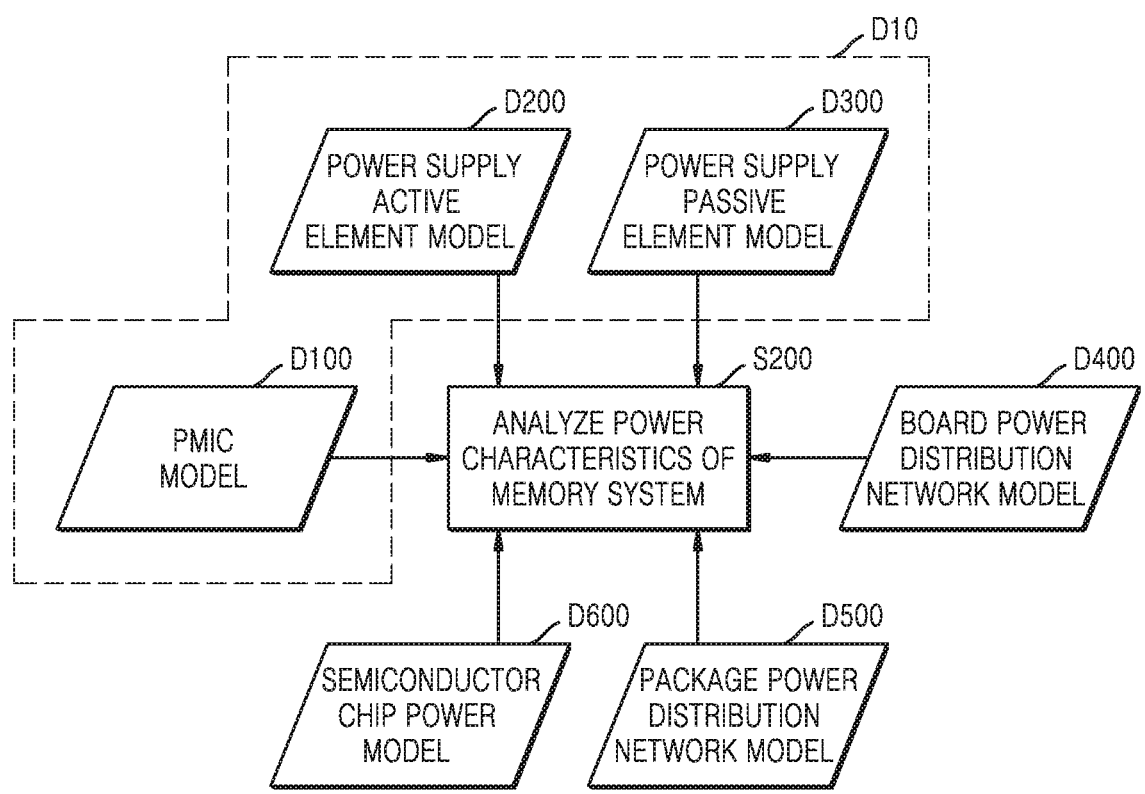
FIG. 2 is a diagram illustrating analyzing power characteristics of a memory system, according to an example embodiment.

FIG. 2 is a diagram illustrating analyzing power characteristics of a memory system, according to an example embodiment.

The method of fabricating the memory system may include designing the memory system (S10) and fabricating the memory system (S20). The designing of the memory system (S10) may include analyzing power characteristics of the memory system and may be performed using a power characteristic tool by a computing system for designing the memory system. Here, the power characteristic tool may be a program including program code, e.g., a plurality of instructions, executed by a processor. Thus, each of the following operations of the method of designing the memory system may be performed by the computing system for designing the memory system and the method of designing the memory system may be referred to as a computer implemented method.

Referring to FIGS. 1 and 2, in an operation S100, power characteristics of respective components of a power supply circuit may be analyzed. For example, the power characteristics of each component of the power supply circuit may include characteristics such as an amount of power consumption of each component, a voltage ripple that is output by each component, a voltage IR drop by each component, an ON/OFF switching sequence of power that is output by each component, a quiescent current of each component, an inrush current of each component, or the like. These examples of power characteristics are illustrative and other power characteristics may also be analyzed.

The power supply circuit may supply power required to drive a semiconductor device constituting the memory system. Power characteristics of respective elements constituting the power supply circuit may be analyzed by using a power supply circuit library D10. Operations constituting the operation S100 will be described below in detail with reference to FIG. 7.

The power supply circuit library D10 may include a power characteristic model of each component constituting the power supply circuit. For example, the power supply circuit may include one or more of a power management circuit, a power supply active element, and a power supply passive element, etc. The power supply circuit library D10 may include one or more of a power management integrated circuit (PMIC) model D100, a power supply active element model D200, and a power supply passive element model D300. For example, the power characteristic model of each element constituting the power supply circuit may be a SPICE model.

For example, a PMIC may include a direct current to direct current (DC-DC) converter such as a buck converter, a boost converter, or a buck-boost converter and a DC linear regulator such as a low-dropout (LDO) regulator. Thus, characteristics of components included in the PMIC may be reflected in the PMIC model, and the PMIC model may include, for example, a DC-DC converter model, a DC linear regulator model, and the like. However, the disclosure is not limited thereto, and the PMIC may further include other components in addition to the DC-DC converter and the DC linear regulator, and the PMIC model may further include other models in addition to the DC-DC converter model and the DC linear regulator model. Because the PMIC may be implemented as one chip and may implement various functions, the PMIC may be individually analyzed regarding power characteristics separately from other power supply active elements, in an example embodiment. For example, the power supply active element may include a voltage regulator module (VRM), a load switch, a current limiter, a voltage detector, a logic circuit, a diode, or the like. Thus, the power supply active element model D200 may include a voltage regulator model, a load switch model, a current limiter model, a voltage detector model, a logic circuit model, a diode model, or the like.

For example, the power supply passive element may include a resistor, an inductor, a capacitor, or the like. Thus, the power supply passive element model D300 may include a resistor model, an inductor model, or a capacitor model.

In an example embodiment, at least one of the power characteristic models included in the power supply circuit library D10 may be encrypted models. That is, information about internal configurations of at least one of the PMIC, the power supply active element, and the power supply passive element, which is the element constituting the power supply circuit, may be encrypted. However, an encrypted model may include information about power that is output by a corresponding element according to power that is input thereto when the corresponding element is connected to another element.

In an operation S200, the power characteristics of the memory system may be analyzed. The power characteristics of the memory system may be analyzed by using models corresponding to the respective components of the memory system, among the PMIC model D100, the power supply active element model D200, the power supply passive element model D300, a board power distribution network model D400, a package power distribution network model D500, and a semiconductor chip power model D600. As discussed above, the power characteristics of the memory system may include characteristics such as an amount of power consumption of the memory system, a voltage ripple in the memory system, a voltage IR drop, a defective power ON/OFF switching sequence, a quiescent current, an inrush current, or the like.

In an example embodiment, the memory system may include the power supply circuit and the semiconductor device and may include a board electrically connecting the power supply circuit to the semiconductor device. Thus, the power characteristics of the memory system may be analyzed based on the power supply circuit and based on a power distribution network of the board, a power distribution network of a package, and power characteristics of a semiconductor chip. The operation S200 will be described below in detail with reference to FIG. 8.

For example, each of the semiconductor device and the power supply circuit, which are included in the memory system, may vary depending upon the kind of the memory system. For example, when the memory system is a solid state drive (SSD), the memory system may include, as the semiconductor chip, a NAND memory chip, a dynamic random access memory (DRAM) chip, and a controller chip. Alternatively, for example, when the memory system includes a dual in-line memory module (DIMM), the memory system may include, as the semiconductor chip, a DRAM chip and a buffer chip. However, the memory system according to the present disclosure is not limited thereto and may include a phase change RAM (PRAM) chip, a ferroelectric RAM (FRAM) chip, or a magnetic RAM (MRAM) chip. Here, the semiconductor chip power model D600 may include a DRAM chip model, a NAND memory chip model, a PRAM chip model, an FRAM chip model, an MRAM chip model, a controller chip model, or a buffer chip model, etc.

In an example embodiment, as a result of performing the operation S100, when the power characteristics of each element of the power supply circuit satisfy an operating condition of the memory system, the operation S200 may be performed, and as a result of performing the operation S200, when the power characteristics of the memory system satisfy the operating condition of the memory system, the operation S20 may be performed. The operation S20 may be performed by mounting the semiconductor device and the power supply circuit on the board.

In the method of fabricating the memory system, according to example embodiments, at least one of the PMIC model D100, the power supply active element model D200, and the power supply passive element model D300 may be an encrypted model. In the method of fabricating the memory system, even though the power supply circuit library D10 includes an encrypted model, each of the PMIC, the power supply active element, and the power supply passive element may be analyzed regarding characteristics of output power varying depending upon a connection relationship thereof with other elements, and a result of the analysis may be used to analyze the power characteristics of the memory system. Therefore, the power characteristics of the memory system may be more accurately analyzed and the memory system exhibiting improved power characteristics may be fabricated based on a result of the analysis, as compared with the related art case where the power characteristics of the overall memory system are analyzed under the assumption that power supplied by the power supply circuit is constant regardless of the power characteristics of each of the board and the memory device.

Figure 3:
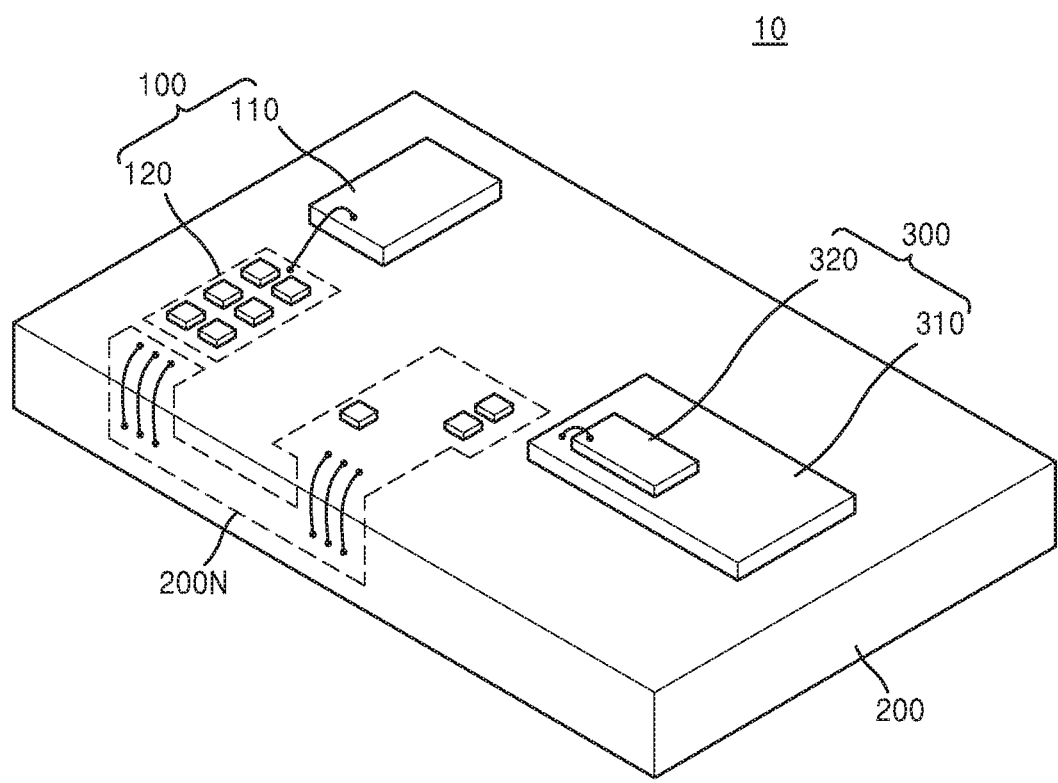
FIG. 3 is a block diagram illustrating a memory system, according to an example embodiment.
Figure 4:
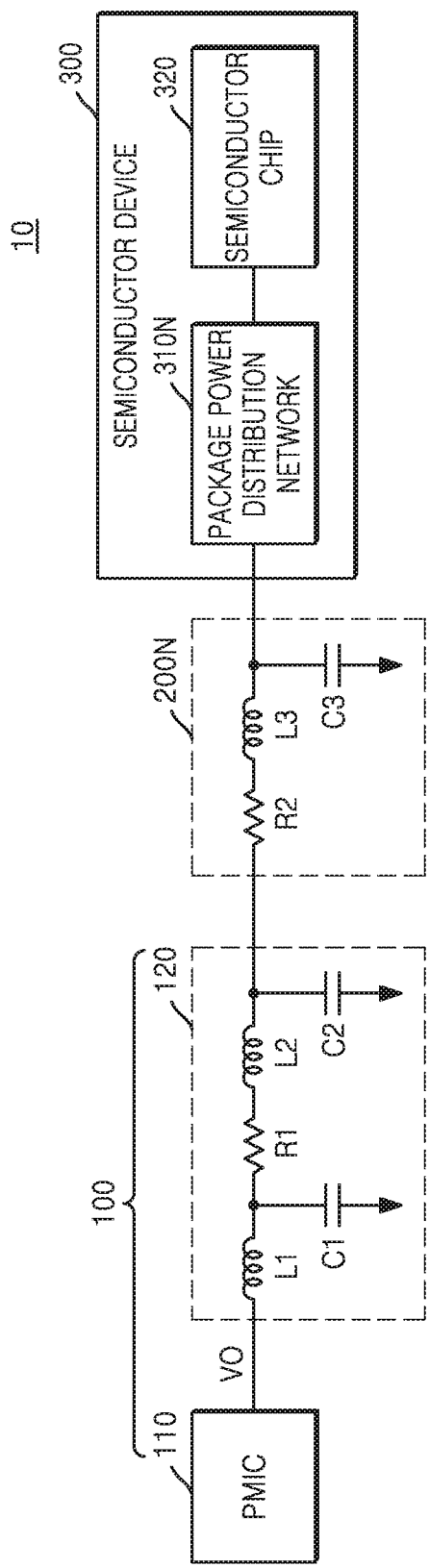
FIG. 4 is a circuit diagram of a memory system, according to an example embodiment.

FIG. 3 is a block diagram illustrating a memory system according to an example embodiment. FIG. 4 is a circuit diagram of the memory system of FIG. 3, according to an example embodiment.

Referring to FIGS. 3 and 4, a memory system 10 may include a power supply circuit 100, a board 200, and a semiconductor device 300. The board 200 may be, for example, a printed circuit board (PCB).

The power supply circuit 100 may include a PMIC 110 and a power transfer circuit 120. The PMIC 110 may be electrically connected to the power transfer circuit 120 and may be arranged physically apart from the semiconductor device 300. The PMIC 110 may provide an output voltage VO at a specific level to the power transfer circuit 120. The PMIC 110 constituting the power supply circuit 100 is an example of a power supply active element, and in some example embodiments, the power supply circuit 100 may include other power supply active elements.

The power transfer circuit 120 may include power supply passive elements. The power transfer circuit 120 may be understood as an equivalent circuit including at least one of a resistor, an inductor, and a capacitor. For example, the power transfer circuit 120 may be represented by inductors L1 and L2, capacitors C1 and C2, and a resistor R1, as shown in FIG. 4. However, the present disclosure is not limited thereto, and in some example embodiments, the power transfer circuit 120 may further include a power supply active element.

The semiconductor device 300 is a component performing a specific function by consuming power and may include a transistor, a conducting wire, and/or a passive element. For example, the semiconductor device 300 may include a semiconductor chip 320 including a microprocessor, an application processor, a memory device, or the like. Here, the memory device may be a volatile memory device such as static RAM (SRAM) or DRAM, or a non-volatile memory device such as PRAM, MRAM, resistive RAM (ReRAM), FRAM, or the like.

The semiconductor device 300 may include the semiconductor chip 320 and a package 310 outside the semiconductor chip 320. The package 310 may include a package power distribution network 310N including conductive lines, and the package power distribution network 310N may electrically connect the semiconductor chip 320 to the board 200. In an example embodiment, the package power distribution network 310N may be understood as an equivalent circuit including at least one of a resistor, an inductor, and a capacitor. The semiconductor device 300 may further include a redistribution layer (RDL) such that wiring in the semiconductor device 300 is facilitated, and the semiconductor chip 320 may be connected to the package power distribution network 310N via the RDL.

The power supply circuit 100 and the semiconductor device 300 may be mounted on the board 200. The board 200 may include a board power distribution network 200N transferring, to the semiconductor device 300, power supplied from the power supply circuit 100. Thus, the semiconductor device 300 arranged apart from the power supply circuit 100 may be supplied with power from the power supply circuit 100 via the board power distribution network 200N.

The board power distribution network 200N may be understood as an equivalent circuit including at least one of a resistor, an inductor, and a capacitor. For example, in some example embodiments, the board power distribution network 200N may be represented by a resistor R2, an inductor L3, and a capacitor C3.

In a method of designing the memory system 10, according to example embodiments, power characteristics of the memory system 10 may be analyzed before the memory system 10 is fabricated, and the memory system 10 may be designed based on a result of the analysis. Here, in analyzing the power characteristics of the memory system 10, a power characteristic model of the power supply circuit 100, for example, a PMIC model (for example, D100 of FIG. 2) and a power supply passive element model (for example, D300 of FIG. 2), may be reflected. For example, characteristics (for example, characteristics of the output voltage VO) of power supplied by the power supply circuit 100 may be analyzed depending upon targets supplied with the power from the power supply circuit 100, such as the kind of the semiconductor chip 320, operations of the semiconductor chip 320, and/or an arrangement of wiring lines connected from the power supply circuit 100 to the semiconductor chip 320. Therefore, the power characteristics internal to the memory system 10 may be accurately analyzed, as compared with the related art case of analyzing power characteristics of each of the board 200 and the semiconductor device 300 under the assumption that the characteristics of the power supplied by the power supply circuit 100 do not vary depending upon the power characteristics of each of the board 200 and the semiconductor device 300.

Figure 5:
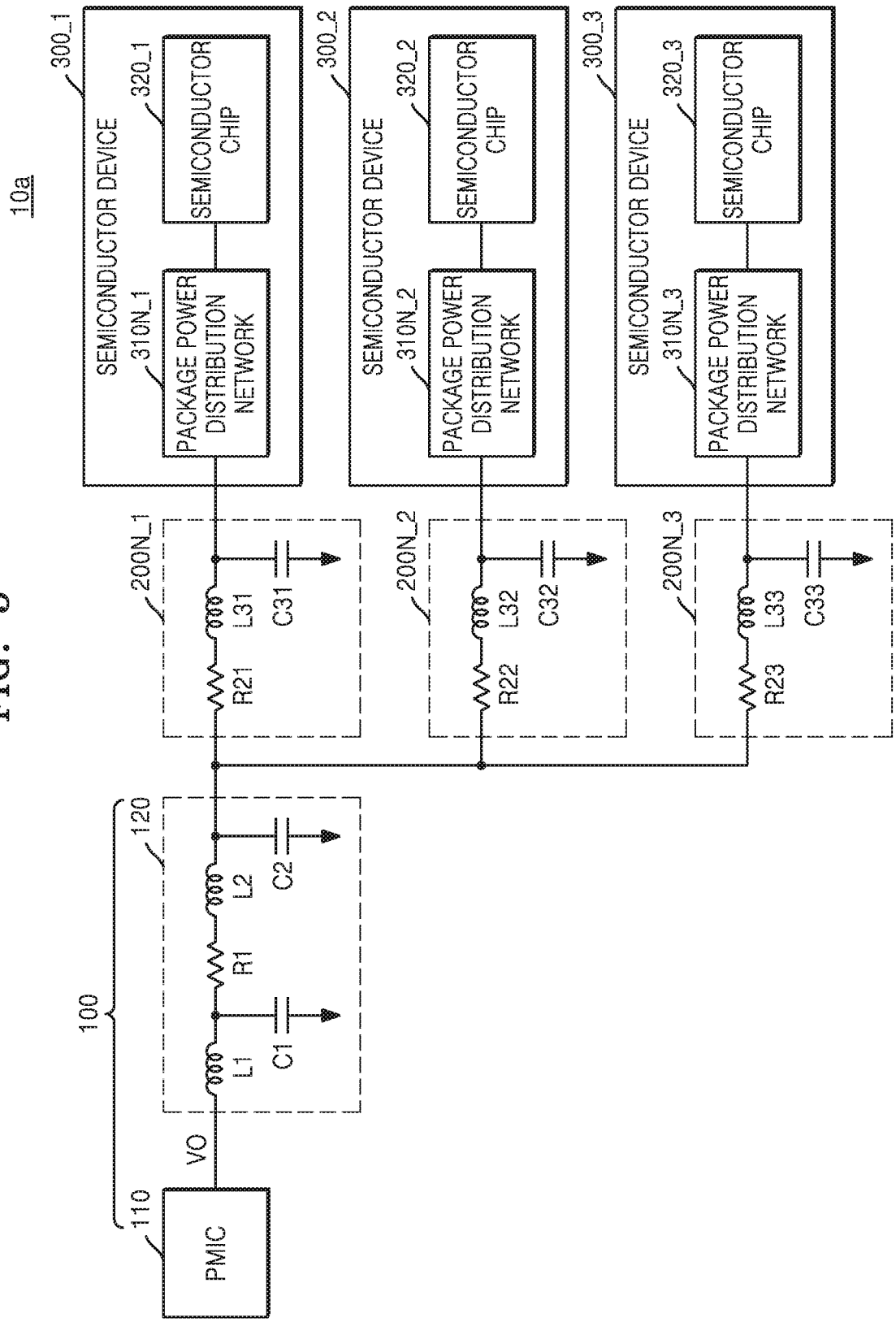
FIG. 5 is a circuit diagram of a memory system, according to an example embodiment.
Figure 6:
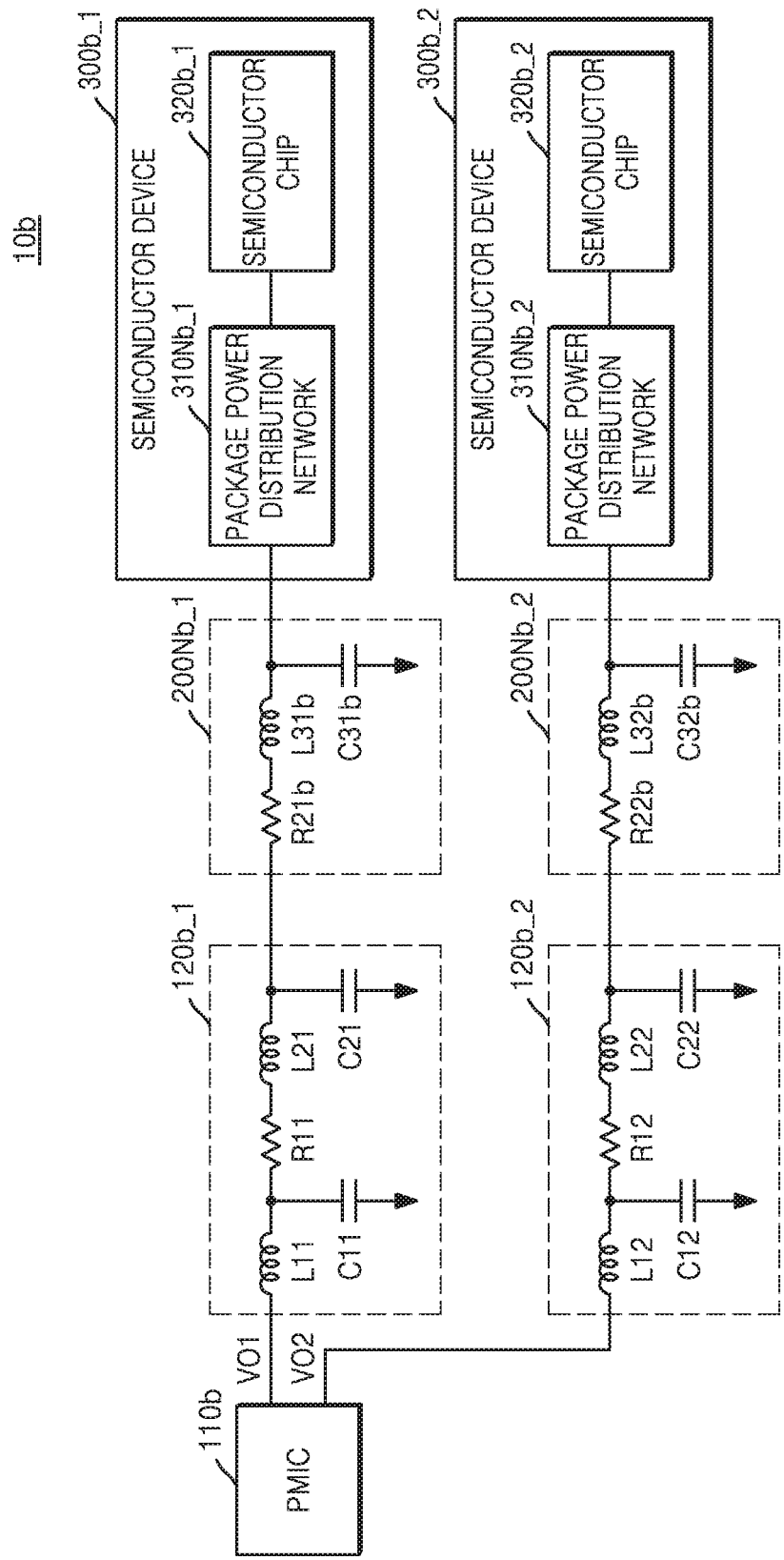
FIG. 6 is a circuit diagram of a memory system, according to an example embodiment.

FIGS. 5 and 6 each illustrate a circuit diagram of a memory system according to an example embodiment. Regarding each of FIGS. 5 and 6, repeated descriptions given with reference to FIG. 4 will be omitted.

Referring to FIG. 5, a memory system 10a may include the power supply circuit 100, a plurality of board power distribution networks 200N_1 to 200N_3, and a plurality of semiconductor devices 300_1 to 300_3. Although FIG. 5 illustrates that the memory system 10a includes three semiconductor devices 300_1 to 300_3 and three board power distribution networks 200N_1 to 200N_3 respectively connected to the three semiconductor devices 300_1 to 300_3, this is merely for descriptive convenience and the present disclosure is not limited thereto. In some embodiments, the number of semiconductor devices 300 and the number of associated board power distribution networks 200N may be more or less than the three shown in FIG. 5. The plurality of board power distribution networks 200N_1 to 200N_3 may include wiring lines electrically connecting the power supply circuit 100 to the plurality of semiconductor devices 300_1 to 300_3, respectively.

To respectively transmit power supplied by the power supply circuit 100 to the plurality of semiconductor devices 300_1 to 300_3, the plurality of board power distribution networks 200N_1 to 200N_3 may include circuits connected to the plurality of semiconductor devices 300_1 to 300_3, respectively. Each of the circuits included in the plurality of board power distribution networks 200N_1 to 200N_3 may have power characteristics varying with characteristics of a semiconductor device connected thereto and/or an arrangement of the semiconductor device. Thus, a board power distribution network model of each of the plurality of board power distribution networks 200N_1 to 200N_3 may vary with a semiconductor device corresponding thereto.

Each of the plurality of board power distribution networks 200N_1 to 200N_3 may be understood as an equivalent circuit including at least one of a resistor, an inductor, and a capacitor. For example, each of the plurality of board power distribution networks 200N_1 to 200N_3 may be represented by a resistor (for example, one of R21 to R23), an inductor (for example, one of L31 to L33), and a capacitor (for example, one of C31 to C33). However, the present disclosure is not limited thereto and, in some example embodiments, each of the plurality of board power distribution networks 200N_1 to 200N_3 may further include an active element.

Each of the plurality of semiconductor devices 300_1 to 300_3 may include a semiconductor chip (for example, one of 320_1 to 320_3) and a package power distribution network (for example, one of 310N_1 to 310N_3). The plurality of semiconductor devices 300_1 to 300_3 may be respectively different kinds of semiconductor devices from each other, and a plurality of semiconductor chips 320_1 to 320_3 may be respectively different kinds of semiconductor chips from each other. Alternatively, in an example embodiment, at least some of the plurality of semiconductor devices 300_1 to 300_3 may be respectively semiconductor devices of the same kind.

For example, the memory system 10a may include a DIMM, each of a first semiconductor device 300_1 and a second semiconductor device 300_2 may include a DRAM memory chip, and a third semiconductor device 300_3 may include a buffer chip. Alternatively, for example, the memory system 10a may include an SSD, the first semiconductor device 300_1 may include a NAND memory chip, the second semiconductor device 300_2 may include a DRAM memory chip, and the third semiconductor device 300_3 may include a controller chip.

In a method of fabricating the memory system 10a, according to example embodiments, a PMIC model (for example, D100 of FIG. 2) and a power supply passive element model (for example, D300 of FIG. 2) of the power supply circuit 100, a board power distribution network model (for example, D400 of FIG. 2) of each of the plurality of board power distribution networks 200N_1 to 200N_3, and a power characteristic model of each of the plurality of semiconductor devices 300_1 to 300_3 may be reflected. Here, the power characteristic model of each of the plurality of semiconductor devices 300_1 to 300_3 may include a package power distribution network model (for example, D500 of FIG. 2) and a semiconductor chip power model (for example, D600 of FIG. 2). Even when the power supply circuit 100 supplies respective power to the plurality of semiconductor devices 300_1 to 300_3, power characteristics of the memory system 10a may be analyzed by using the PMIC model D100 and the power supply passive element model D300. Therefore, according to example embodiments, the power characteristics of the memory system 10a may be more accurately predicted and the memory system 10a exhibiting improved power characteristics may be fabricated.

Referring to FIG. 6, a memory system 10b may include a PMIC 110b, a first power transfer circuit 120b_1 and a second power transfer circuit 120b_2, a first board power distribution network 200Nb_1 and a second board power distribution network 200Nb_2, and a first semiconductor device 300b_1 and a second semiconductor device 300b_2. In the first and second board power distribution networks 200Nb_1 and 200Nb_2, different wiring lines making electrical connections of the power supply circuit 100b to the first and second semiconductor devices 300b_1 and 300b_2 may be arranged, respectively.

The PMIC 110b may output a first output voltage VO1 and a second output voltage VO2, which respectively have different magnitudes of voltage from each other. The first output voltage VO1 may be transferred to the first semiconductor device 300b_1 via the first power transfer circuit 120b_1 and the first board power distribution network 200Nb_1. The second output voltage VO2 may be transferred to the second semiconductor device 300b_2 via the second power transfer circuit 120b_2 and the second board power distribution network 200Nb_2.

The PMIC 110b may output both the first output voltage VO1 and the second output voltage VO2 together, or may in some cases output only the first output voltage VO1 or only the second output voltage VO2. Although FIG. 6 illustrates that the PMIC 110b outputs two voltages having different magnitudes from each other, the present disclosure is not limited thereto, and in some example embodiments, the PMIC 110b may output three or more voltages having different magnitudes from each other or may output voltages having substantially the same magnitude via different output pins from each other.

Each of the first power transfer circuit 120b_1 and the second power transfer circuit 120b_2 may be understood as an equivalent circuit including at least one of a resistor, an inductor, and a capacitor. For example, the first power transfer circuit 120b_1 may include inductors L11 and L21, capacitors C11 and C21, and a resistor R11, and the second power transfer circuit 120b_2 may include inductors L12 and L22, capacitors C12 and C22, and a resistor R12. However, the present disclosure is not limited thereto, and in some example embodiments, each of the first power transfer circuit 120b_1 and the second power transfer circuit 120b_2 may further include an active element.

Each of the first board power distribution network 200Nb_1 and the second board power distribution network 200Nb_2 may be understood as an equivalent circuit including at least one of a resistor, an inductor, and a capacitor. For example, the first board power distribution network 200Nb_1 may include a resistor R21b, an inductor L31b, and a capacitor C31b, and the second board power distribution network 200Nb_2 may include a resistor R22b, inductors L32b, and a capacitor C32b.

The first semiconductor device 300b_1 and the second semiconductor device 300b_2 may be respectively different kinds of semiconductor devices from each other. For example, the memory system 10b may include an SSD, the first semiconductor device 300b_1 may include a memory device, and the second semiconductor device 300b_2 may include a memory controller. However, the present disclosure is not limited thereto, and in some example embodiments each of first semiconductor device 300b_1 and the second semiconductor device 300b_2 may include a memory device.

The first semiconductor device 300b_1 may include a first semiconductor chip 320b_1 and a first package power distribution network 310Nb_1, and the second semiconductor device 300b_2 may include a second semiconductor chip 320b_2 and a second package power distribution network 310Nb_2. Each of the first package power distribution network 310Nb_1 and the second package power distribution network 310Nb_2 may be understood as an equivalent circuit including at least one of a resistor, an inductor, and a capacitor. However, the present disclosure is not limited thereto, and in some example embodiments each of the first package power distribution network 310Nb_1 and the second package power distribution network 310Nb_2 may further include an active element.

In a method of fabricating the memory system 10b, according to example embodiments, characteristics of the first output voltage VO1 output from the PMIC 110b may be analyzed in advance, based on information about each of the first power transfer circuit 120b_1, the first board power distribution network 200Nb_1, and the first semiconductor device 300b_1. In addition, in the method of fabricating the memory system 10b, characteristics of the second output voltage VO2 output from the PMIC 110b may be analyzed in advance, based on information about each of the second power transfer circuit 120b_2, the second board power distribution network 200Nb_2, and the second semiconductor device 300b_2. Therefore, according to example embodiments, power characteristics of the memory system 10b may be more accurately predicted and the memory system 10b exhibiting improved power characteristics may be fabricated.

Figure 7:
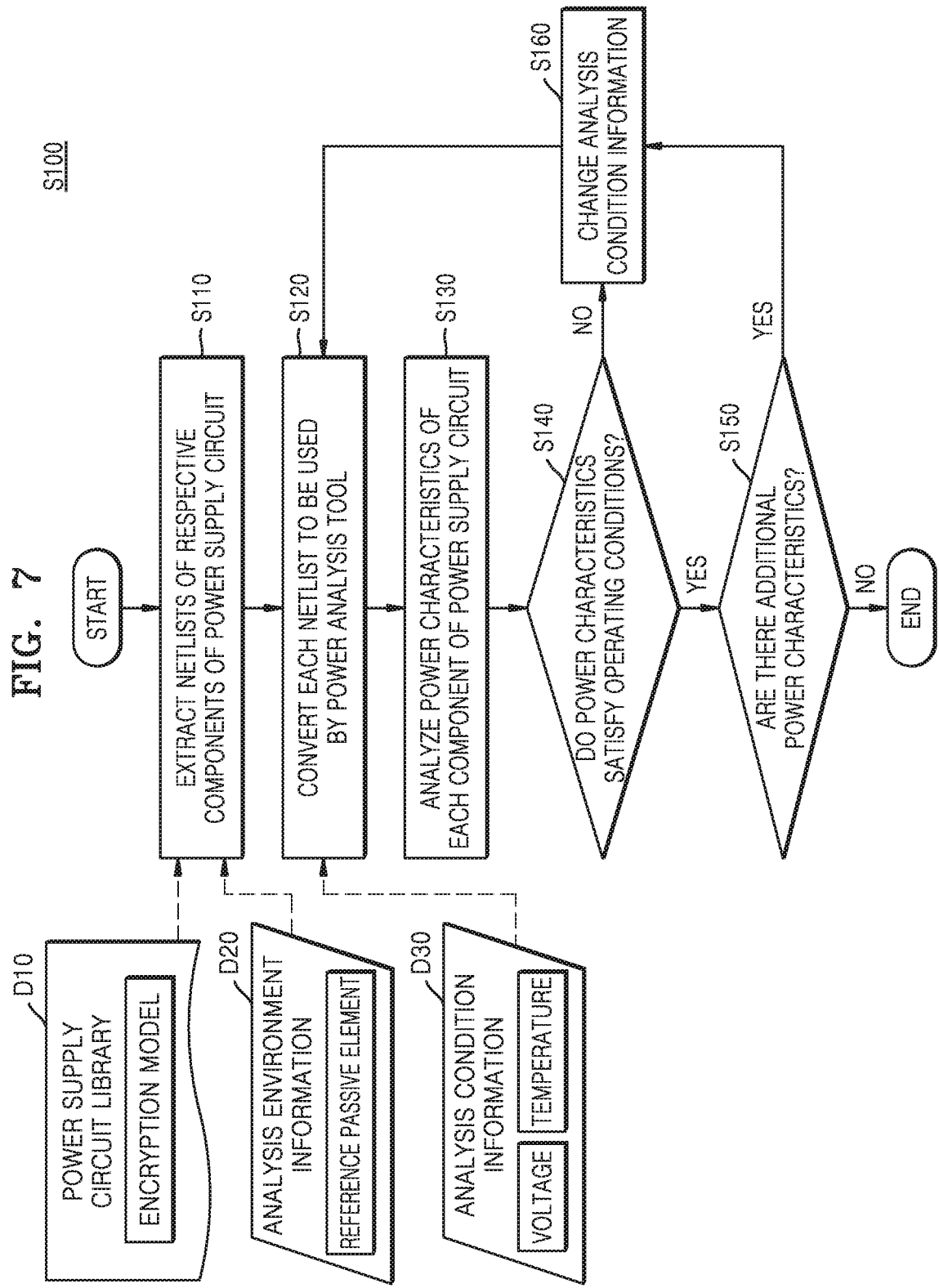
FIG. 7 is a flowchart illustrating a method of designing a memory system, according to an example embodiment.

FIG. 7 is a flowchart illustrating a method of designing a memory system, according to an example embodiment, and in particular, FIG. 7 is a flowchart illustrating the operation S100 of FIG. 1. The operation S100 may include operations S110 to S160. In an example embodiment, the operations S110 to S160 may be sequentially performed on individual components included in a power supply circuit. Each of the following operations of the method of designing the memory system may be performed by a computing system for designing the memory system.

Referring to FIG. 7, in the operation S110, a netlist of each component of the power supply circuit may be extracted. The netlist extraction operation may be performed by using the power supply circuit library D10 and analysis environment information D20. The analysis environment information D20 may include information about a reference passive element used to extract the netlist of each component constituting the power supply circuit.

The netlist extraction may refer to generating data about a connection relationship of the power supply circuit and a reference passive element corresponding to the power supply circuit under the assumption that the power supply circuit is connected to the reference passive element corresponding thereto. In an example embodiment, the netlist extraction operation may be performed by using a synthesis tool. Here, the synthesis tool may be a program including program code, e.g., a plurality of instructions, executed by a processor.

The power supply circuit library D10 may include a power characteristic model of each component constituting the power supply circuit. For example, the power supply circuit library D10 may include the PMIC model D100, the power supply active element model D200, and the power supply passive element model D300. In an example embodiment, at least some of the power characteristic models included in the power supply circuit library D10 may be encrypted models. Each encrypted model may include information about power that is output by a corresponding element according to power that is input thereto when the corresponding element is connected to another element.

The power supply circuit may include at least one of a PMIC, a power supply active element, and a power supply passive element. The power supply active element may include at least one of a voltage regulator module, a load switch, a current limiter, a voltage detector, a logic circuit, and a diode, and the power supply passive element may include at least one of a resistor, an inductor, a capacitor, or the like. For example, when the power supply circuit includes a PMIC, a load switch, and a capacitor, in the operation S110, a netlist indicating a connection relationship between the PMIC and a reference passive element corresponding to the PMIC may be extracted, a netlist indicating a connection relationship between the load switch and a reference passive element corresponding to the load switch may be extracted, and a netlist indicating a connection relationship between the capacitor and a reference passive element corresponding to the capacitor may be extracted.

In the operation S120, each of the extracted netlists may be converted to be used by a power analysis tool. The netlist extraction operation may be performed by the synthesis tool, and power characteristic analysis of each element of the power supply circuit may be performed by the power analysis tool. Therefore, in the operation S120, each netlist generated in the operation S110 may be converted to be able to be used for the power analysis tool. That is, the netlist conversion operation may refer to converting a netlist into a format that may be accessed by the power analysis tool.

The netlist conversion operation may be performed by using analysis condition information D30. In an example embodiment, the analysis condition information D30 may include information about voltage that is input to an element targeted by power characteristic analysis, a temperature at which the element targeted by power characteristic analysis is operated, and the like. However, this is provided as an example merely for descriptive convenience, and the analysis condition information D30 may include various conditions influencing the characteristics of the components of the power supply circuit. That is, the analysis condition information D30 may include information about conditions causing changes in the power characteristics of the components of the power supply circuit.

For example, capacitance characteristics of a capacitor included in the power supply circuit may vary with temperatures and may also vary with magnitudes of voltage supplied to the capacitor. Therefore, a netlist extracted for the capacitor included in the power supply circuit may be modified for use by the power analysis tool, based on information about temperature at which the capacitor is operated and information about voltage supplied to the capacitor.

In the operation S130, the power characteristics of each component of the power supply circuit may be analyzed. The power characteristic analysis may refer to analyzing characteristics of power that is output from each element of the power supply circuit according to power that is input to each element of the power supply circuit under the assumption that each component of the power supply circuit is connected to a reference passive element corresponding thereto. For example, the power characteristics of each element of the power supply circuit may include one or more of an amount of power consumption, a voltage ripple, a voltage IR drop, a defective power ON/OFF sequence, start delay time, a quiescent current, an inrush current, or the like.

In the operation S140, it may be determined whether the analyzed power characteristics satisfy operating conditions. In some example embodiments, it is determined whether the analyzed power characteristics satisfy the operating conditions of the memory system. In some embodiments, it may be determined whether the analyzed power characteristics of each component of the power supply circuit satisfies respective operating conditions for the component. When it is determined that the analyzed power characteristics of satisfy the respective operating conditions of the component (S140, YES), in the operation S150, it may be determined whether there are additional power characteristics to be analyzed in addition to the analyzed power characteristics. When it is determined that there are no additional power characteristics to be analyzed (S150, NO), the method ends. On the other hand, when the analyzed power characteristics do not satisfy the operating conditions (S140, NO) or there are additional power characteristics to be analyzed (S150, YES), the analysis condition information may be changed in the operation S160, and the operations S120 and S130 may be performed again. However, the present disclosure is not limited thereto, and in some embodiments, when there are additional power characteristics to be analyzed, the operations S120 and S130 may be performed again without performing the operation S160.

According to the method of designing the memory system, according to example embodiments, in analyzing the power characteristics of each of the components included in the power supply circuit, even though encrypted models of the components are provided, the netlist for each component may be extracted and may be modified to correspond to the power analysis tool, whereby the power characteristics of each element may be analyzed. Therefore, the characteristics of the power supplied by the power supply circuit may be analyzed, and it may be checked in advance whether requirements for the power supply circuit to normally operate are satisfied.

Figure 8:
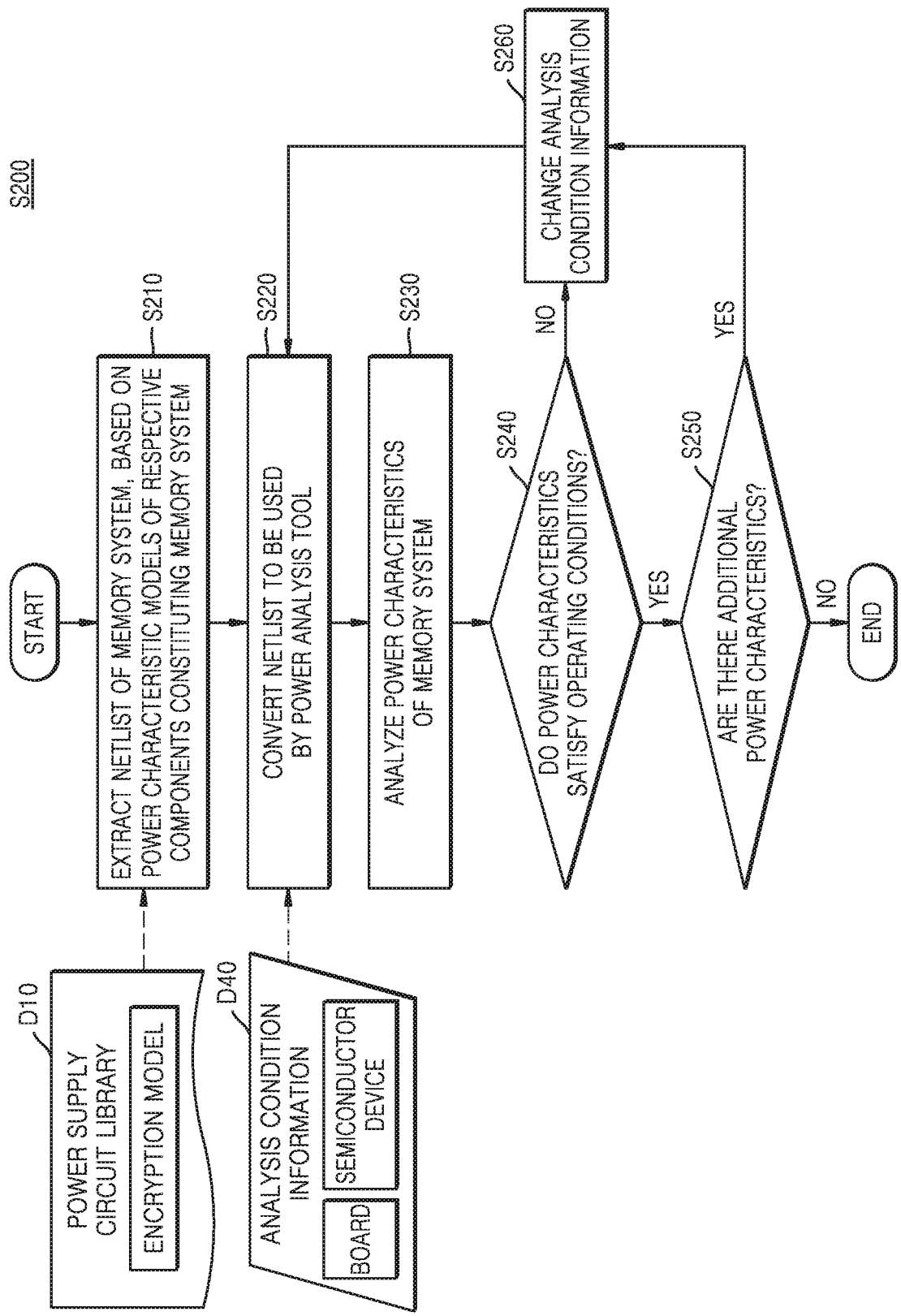
FIG. 8 is a flowchart illustrating a method of designing a memory system, according to an example embodiment.

FIG. 8 is a flowchart illustrating a method of designing a memory system, according to an example embodiment, and in particular, FIG. 8 is a flowchart illustrating the operation S200 of FIG. 2. The operation S200 may include operations S210 to S260. Each of the following operations of the method of designing the memory system may be performed by a computing system for designing the memory system.

Referring to FIG. 8, in the operation S210, a netlist of the memory system may be extracted based on power characteristic models of respective components constituting the memory system. For example, as in the memory system 10 shown in FIG. 3, when the memory system includes the PMIC 100, the power transfer circuit 120 including passive elements, the board 200, and the semiconductor device 300, a netlist of the memory system 10 may be extracted by using the PMIC model D100, the power supply passive element model D300, the board power distribution network model D400, the package power distribution network model D500, and the semiconductor chip power model D600 in FIG. 2. The netlist extraction may refer to generating data about a connection relationship between the respective components of the memory system.

In an example embodiment, at least some of the power characteristic models of the components constituting the memory system may be encrypted models. Each encrypted model may include, when a corresponding component is connected to another component, information about power that is output from the corresponding component according to power that is input to the corresponding component. Therefore, even though an encrypted model of a component of the memory system is provided, information about output power of the power supply circuit, which varies based on a connection relationship between the power supply circuit and another component, may be obtained.

In the operation S220, the extracted netlist may be converted to be used by a power analysis tool. The netlist extraction operation may be performed by a synthesis tool, and power characteristic analysis may be performed by the power analysis tool. Thus, in the operation S220, the netlist generated in the operation S210 may be converted to be able to be used for the power analysis tool.

The netlist conversion operation may be performed by using analysis condition information D40. In an example embodiment, the analysis condition information D40 may include data about characteristics of a component targeted by the power characteristic analysis. For example, the analysis condition information D40 may include one or more of design data of a wiring line constituting a board power distribution network, design data of a wiring line constituting a package power distribution network of a semiconductor device, and internal design data of a semiconductor chip. However, this is provided as an example merely for descriptive convenience, and the analysis condition information D40 may include design information about various components constituting the memory system.

In the operation S230, the power characteristics of the memory system may be analyzed. The power characteristic analysis of the memory system may be performed by a processor of the computing system by using the power analysis tool. For example, the power characteristics of the memory system may include characteristics such as an amount of power consumption of the memory system, a voltage ripple in the memory system, a voltage IR drop, a defective power ON/OFF switching sequence, a quiescent current, an inrush current, or the like.

In the operation S240, it may be determined whether the analyzed power characteristics satisfy the operating conditions. In some example embodiments, it is determined whether the analyzed power characteristics satisfy the operating conditions of the memory system. When it is determined that the analyzed power characteristics satisfy the operating conditions (S240, YES), in the operation S250, it may be determined whether there are additional power characteristics to be analyzed in addition to the analyzed power characteristics. When it is determined that there are no additional power characteristics to be analyzed (S250, NO), the method ends. On the other hand, when the analyzed power characteristics do not satisfy the operating condition (S240, NO) or there are additional power characteristics to be analyzed (S250, YES), the analysis condition information may be changed in the operation S260, and the operations S220 and S230 may be performed again. However, the present disclosure is not limited thereto, and in some embodiments, when there are additional power characteristics to be analyzed, the operations S220 and S230 may be performed again without performing the operation S260.

The operation S260 of changing the analysis condition information may include changing at least one of the design data of the wiring line constituting the board power distribution network, the design data of the wiring line constituting the package power distribution network of the semiconductor device, and the internal design data of the semiconductor chip. In an example embodiment, at least one of design data of the board, package design data of the semiconductor device, and design data of the semiconductor chip may be changed based on a result of analyzing the power characteristics of the memory system. For example, a layer of a wiring line included in the board power distribution network arranged in the board may be changed, or characteristics of a resistor, an inductor, or a capacitor included in the board power distribution network may be changed.

According to the method of designing the memory system, according to example embodiments, in analyzing the power characteristics of the memory system, even though encrypted models of some of the components constituting the memory system are provided, a netlist may be extracted according to a connection relationship between some components set forth above and other components and may be converted to correspond to the power analysis tool, whereby the power characteristics of the memory system may be analyzed. Therefore, because it may be checked in advance whether requirements for the memory system to normally operate are satisfied and, when the requirements are not satisfied, a design of a component inside the memory system may be modified, the memory system exhibiting improved power characteristics may be fabricated.

Figure 9:
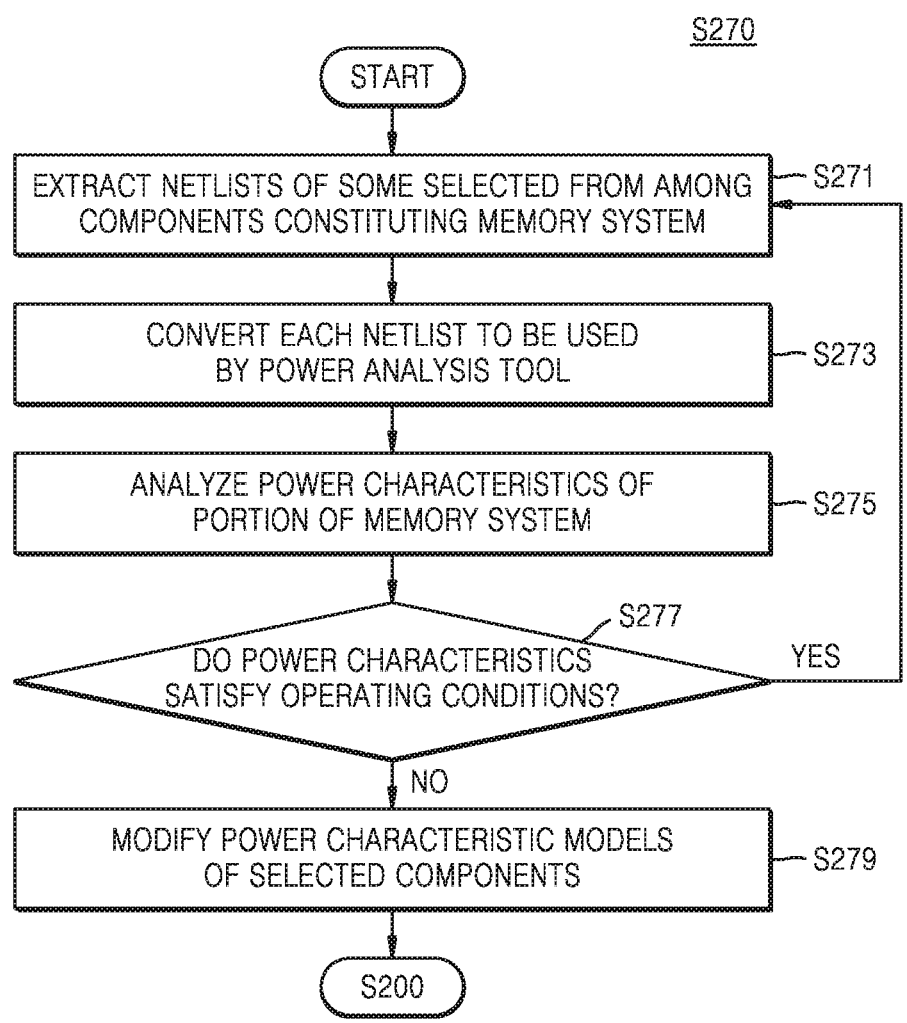
FIG. 9 is a flowchart illustrating a method of designing a memory system, according to an example embodiment.

FIG. 9 is a flowchart illustrating a method of designing a memory system, according to an example embodiment. An operation S270 may be performed after the operation S140 of FIG. 7 or the operation S240 of FIG. 8, specifically when it is determined that the power characteristics do not satisfy the operating conditions (S140 or S240, NO).

Referring to FIG. 9, in an operation S271, some of the components constituting the memory system may be selected and netlists of the selected components may be extracted. The netlist extraction may refer to generating data about a connection relationship between the selected components.

In an example embodiment, the selected components may include components included in the power supply circuit. For example, when the memory system 10 of FIG. 3 includes the PMIC 100, the power transfer circuit 120 including passive elements, the board 200, and the semiconductor device 300, in the operation S271, the PMIC 100 and the power transfer circuit 120 may be selected, and a netlist may be extracted based on the PMIC model D100 and the power supply passive element model D300 in FIG. 2. Because the power characteristics of each component included in the power supply circuit have been analyzed by the operation S100 and each component included in the power supply circuit has satisfied the operation condition, an operation of analyzing power characteristics of a portion of the memory system after the components included in the power supply circuit are connected to the other components of the memory system may be performed.

In an operation S273, the extracted netlists may be converted to be used by the power analysis tool by using the analysis condition information (for example, D30 of FIG. 7 and D40 of FIG. 8). In an example embodiment, the analysis condition information D40 may include data about characteristics of components targeted by the power characteristic analysis.

In an operation S275, power characteristics of the portion of the memory system may be analyzed. That is, the power characteristics of the portion of the memory system in a state in which the selected components in the operation S271 are electrically connected may be analyzed.

In an operation S277, it may be determined whether the analyzed power characteristics of the portion of the memory system satisfy the operating condition of the memory system. When the operating condition of the memory system is satisfied (S277, YES), the operation S271 may be performed again to find a component causing the operation S140, S240 not to be satisfied, and a netlist may be extracted by selecting, from among the components constituting the memory system, some components including a component that has not been previously selected. Next, the operations S273 to S275 may be performed again.

When the analyzed power characteristics of the portion of the memory system do not satisfy the operating condition of the memory system (S277, NO), power characteristic models of the selected components of the memory system may be modified in the operation S279. Although power characteristics of each of the selected components of the memory system may satisfy an operating condition of each of the selected components, there may occur a conflict between the respective power characteristic models due to connections between the selected components. Therefore, after modifying the power characteristic models of the selected components of the memory system, the computing system for designing the memory system may perform the operation S200 of FIG. 8 again.

Figure 10:
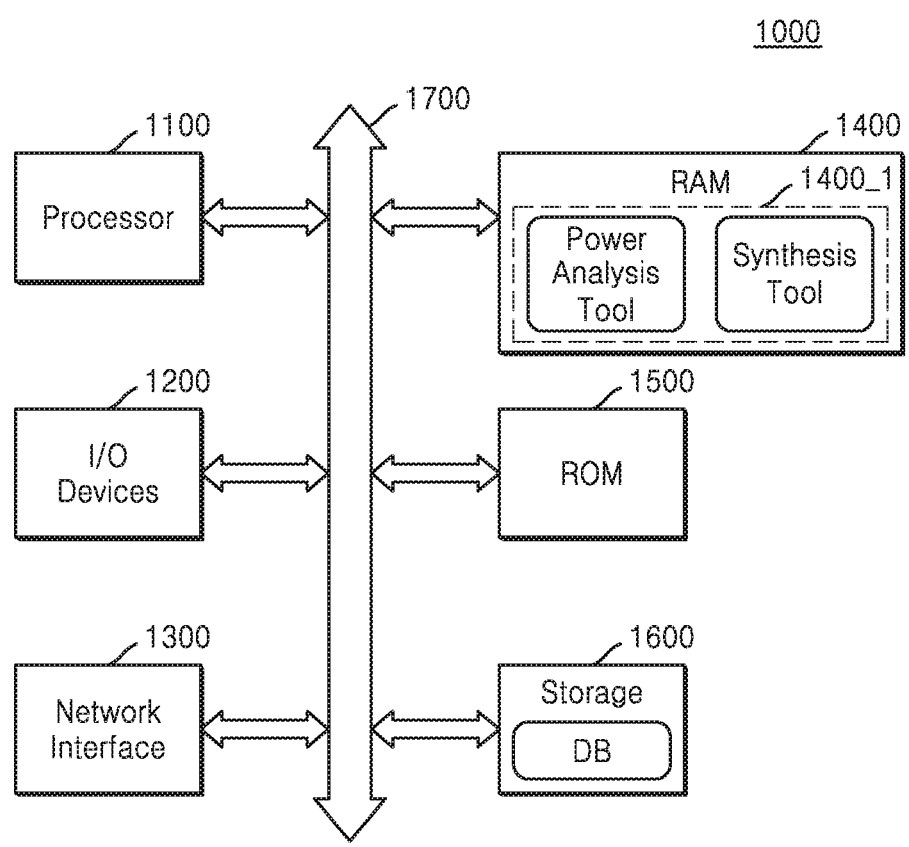
FIG. 10 is a block diagram illustrating a computing system which includes memory storing a program, according to an example embodiment.

FIG. 10 is a block diagram illustrating a computing system which includes memory storing a program, according to an example embodiment. At least some of the operations included in the method of fabricating a memory system (for example, the operation S10 of FIG. 1, the operation S100 of FIG. 7, the operation S200 of FIG. 8, and the operation S270 of FIG. 9), according to example embodiments, may be performed by a computing system 1000.

The computing system 1000 may be a fixed computing system, such as a desktop computer, a workstation, a server, or the like, or a portable computing system, such as a laptop computer or the like. As shown in FIG. 10, the computing system 1000 may include a processor 1100, input/output (I/O) devices 1200, a network interface 1300, RAM 1400, read-only memory (ROM) 1500, and storage 1600. The processor 1100, the I/O devices 1200, the network interface 1300, the RAM 1400, the ROM 1500, and the storage 1600 may be connected to a bus 1700 and may communicate with each other via the bus 1700.

The processor 1100 may be referred to as a processing unit and, like, for example, a microprocessor, an application processor (AP), a digital signal processor (DSP), or a graphic processing unit (GPU), may include at least one core capable of executing any instruction set (for example, Intel Architecture-32 (IA-32), 64-bit extension IA-32, x86-64, PowerPC, Sparc, MIPS, ARM, IA-64, or the like). For example, the processor 1100 may access memory, that is, the RAM 1400 or the ROM 1500, via the bus 1700 and may execute instructions stored in the RAM 1400 or the ROM 1500.

The RAM 1400 may store a program 1400_1 for designing and fabricating the memory system according to an example embodiment or at least a portion thereof, and the program 1400_1, when executed by the processor 1100, may cause the processor 1100 to perform at least some of the operations included in the method of fabricating the memory system (for example, the operation S10 of FIG. 1, the operation S100 of FIG. 7, the operation S200 of FIG. 8, and the operation S270 of FIG. 9).

The program 1400_1 may include a power analysis tool and a synthesis tool. The power analysis tool may include program code, e.g., a plurality of instructions, executable by the processor 1100, and the program code included in the power analysis tool may, when executed by the processor 1100, cause the processor 1100 to perform the operations S100 and S200 of FIG. 1, the operation S130 of FIG. 7, the operation S230 of FIG. 8, and the operation S275 of FIG. 9. The synthesis tool may include program code, e.g., a plurality of instructions, executable by the processor 1100. The program code included in the synthesis tool may, when executed by the processor 1100, cause the processor 1100 to perform the operation S110 of FIG. 7, the operation S210 of FIG. 8, and the operation S271 of FIG. 9.

In an example embodiment, the processor 1100 may execute the power analysis tool and thus perform a power characteristic analysis operation by using a power characteristic model (for example, a PMIC model, a power supply active element model, and a power supply passive element model) of a power supply circuit, a board power distribution network model, and a power characteristic model (for example, a package power distribution network model and a semiconductor chip power model) of a semiconductor device. Therefore, in the method of fabricating a memory system, according to example embodiments, the power characteristic model of the power supply circuit supplying power as well as the power characteristic model of the semiconductor device or the like consuming power may be reflected, thereby more accurately predicting the power characteristics of the memory system. Because a configuration of the memory system may be changed based on the predicted power characteristics, the method of fabricating the memory system, according to example embodiments, may allow the memory system exhibiting improved power characteristics to be fabricated.

The storage 1600 may not lose data stored therein even though power supplied to the computing system 1000 is shut off. For example, the storage 1600 may include a non-volatile memory device or may include a storage medium such as magnetic tape, an optical disk, or a magnetic disk. In addition, the storage 1600 may be attachable to and detachable from the computing system 1000. The storage 1600 may store the program 1400_1 according to an example embodiment, and before the program 1400_1 is executed by the processor 1100, the program 1400_1 or at least a portion thereof may be loaded from the storage 1600 onto the RAM 1400. Alternatively, the storage 1600 may store a file written in a programming language, and the program 1400_1, which is generated from the file by a compiler or the like, or at least a portion of the program 1400_1 may be loaded onto the RAM 1400. In addition, as shown in FIG. 10, the storage 1600 may store a database (DB), and the database may include information to design the memory system, for example, the power supply circuit library D10 of FIG. 1, and the PMIC model D100, the power supply active element model D200, the power supply passive element model D300, the board power distribution network model D400, the package power distribution network model D500, and the semiconductor chip power model D600 of FIG. 2.

The storage 1600 may store data to be processed by the processor 1100 or data that has been processed by the processor 1100. That is, the processor 1100 may generate data by processing data stored in the storage 1600 and store the generated data in the storage 1600, according to the program 1400_1.

The I/O devices 1200 may include an input device such as a keyboard, a pointing device, or the like, and an output device such as a display device, a printer, or the like. For example, a user may trigger the execution of the program 1400_1 by the processor 1100 via the I/O devices 1200 and may input the analysis environment information D20 and the analysis condition information D30 of FIG. 7 and the analysis condition information D40 of FIG. 8 via the I/O devices 1200.

The network interface 1300 may provide access to a network external to the computing system 1000. For example, the network may include a large number of computing systems and communication links, and the communication links may include wired links, optical links, wireless links, or any other types of links.

While the inventive concept has been particularly shown and described with reference to embodiments thereof, it will be understood that various changes in form and details may be made therein without departing from the spirit and scope of the following claims.

What is claimed is:

1. A method of designing a memory system which comprises a semiconductor device and a power supply circuit supplying power to the semiconductor device via a board power distribution network, the method comprising:
    analyzing, by at least one processor, power characteristics of respective components of the power supply circuit by using a power characteristic model of the power supply circuit; and
    analyzing, by the at least one processor, power characteristics of the memory system,
    wherein the power characteristic model of the power supply circuit comprises an encrypted model, and
    wherein the analyzing of the power characteristics of the respective components of the power supply circuit comprises:
    extracting a netlist, which is data about a connection relationship between each component of the power supply circuit and a reference passive element corresponding to each component of the power supply circuit;
    converting the extracted netlist to be used by a power analysis tool; and
    analyzing the power characteristics of the respective components by using the power analysis tool.

2. The method of claim 1, wherein the converting comprises:
    converting the extracted netlist to be used by the power analysis tool, based on analysis condition information,
    wherein the analysis condition information comprises information about conditions causing changes in the power characteristics of the components of the power supply circuit.

3. The method of claim 2, wherein
    the analysis condition information comprises at least one of information about a temperature at which each component of the power supply circuit is operated and information about a voltage level supplied to each component of the power supply circuit.

4. The method of claim 2, wherein,
    when the power characteristics of each component of the power supply circuit do not satisfy respective operating conditions of the component of the power supply circuit, the analysis condition information is changed.

5. A method of designing a memory system which comprises a semiconductor device and a power supply circuit supplying power to the semiconductor device via a board power distribution network, the method comprising:

analyzing, by at least one processor, power characteristics of respective components of the power supply circuit by using a power characteristic model of the power supply circuit; and analyzing, by the at least one processor, power characteristics of the memory system, wherein the power characteristic model of the power supply circuit comprises an encrypted model, and wherein the analyzing of the power characteristics of the memory system comprises:

extracting a netlist, which is data about a connection relationship between components of the memory system, by using a power characteristic model of each component of the memory system;

converting the extracted netlist to be used by a power analysis tool; and analyzing the power characteristics of the memory system by using the power analysis tool.

6. The method of claim 5, wherein the converting comprises converting the extracted netlist to be used by the power analysis tool, based on analysis condition information, wherein the analysis condition information comprises design information of the semiconductor device and design information of the board power distribution network.

7. The method of claim 6, further comprising:

when the power characteristics of the memory system do not satisfy operating conditions of the memory system, changing the analysis condition information.

8. The method of claim 6, further comprising:

when the power characteristics of the memory system do not satisfy operating conditions of the memory system, re-extracting the netlist by selecting some of the components of the memory system;

converting the re-extracted netlist to be used by the power analysis tool; and analyzing the power characteristics of the selected components of the memory system.

* * * * *